Aug. 14, 1945.    J. M. BLACKMON ET AL    2,382,852
STAND HOOKS
Filed Sept. 18, 1942
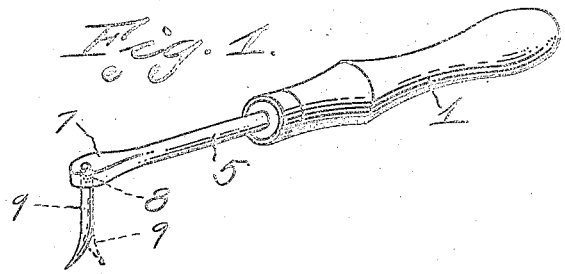
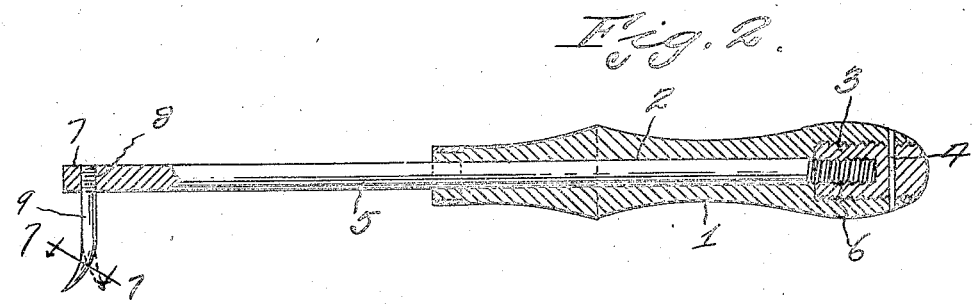
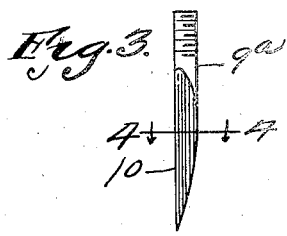   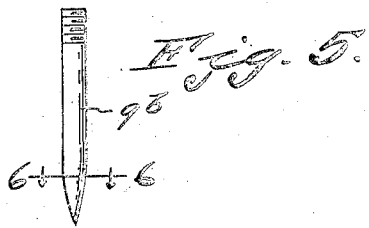
      
Inventors
John M. Blackmon and
Joseph F. LeGere
By Philip A. Ferrell
their Attorney Patented Aug. 14, 1945

2,382,852

UNITED STATES PATENT OFFICE 2,382,852

STAND HOOK

John M. Blackmon and Joseph F. Le Gere, Rock Hill, S. C.

Application September 18, 1942, Serial No. 458,914

1 Claim. (Cl. 28—1)

The invention relates to stand hooks of the general type used in cotton mills for cutting and pulling away cotton which gathers on steel rollers, and has for its object to provide a device of this character comprising a handle member which may be repeatedly used and a detachable stripping or cutting member formed from a soft metal, for instance brass, which will not score or mark the roller, and at the same time conserving brass, as the cutting and stripping arms may be renewed from time to time. It is the present practice to form stand hooks from a single piece of metal, bent to form and sharpened, and when the tool gets too short from repeated bending and sharpening, the whole tool is discarded. When the tool is relatively short there is danger of injury to the hand of the operator.

A further object is to provide a stand hook comprising a handle member having a detachable soft metal stripping element at one end thereof.

A further object is to provide a threaded member anchored in the handle and into which the tool shank is threaded.

A further object is to provide the detachable arm with a threaded connection with the outer end of the handle member.

A further object is to form the detachable stripping elements from a soft metal which may be repeatedly sharpened from time to time and discarded when too short, without discarding the entire tool.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the tool.

Figure 2 is a vertical longitudinal sectional view through the tool.

Figure 3 is a side elevation of one of the detachable members having a cutting edge.

Figure 4 is a horizontal sectional view taken on line 4—4 of Figure 3.

Figure 5 is a view in elevation of a straight stripping element.

Figure 6 is a horizontal sectional view taken on line 6—6 of Figure 5.

Figure 7 is a transverse sectional view taken on line 7—7 of Figure 2.

Referring to the drawing, the numeral 1 designates the handle of the tool, which handle is provided with a longitudinal bore 2 having a threaded sleeve 3 therein, preferably anchored against rotation by a cross pin 4. The handle is preferably formed from wood and extending longitudinally through the bore 2 is the shank 5 of the tool. The end of the shank is threaded at 6 into the metallic sleeve 3, therefore it will be seen that during the pulling or pushing operation of the tool over a roller, the shank is positively anchored within the wooden handle 1. The outer end of the shank 5 is preferably flattened as shown at 7, and has threaded therein, at 8, one of the stripping tools 9. The stripping elements are formed from a soft metal, for instance brass, which will not score the rollers during the stripping operation. The stripping tool shown in Figures 1 and 2 is of the horn type and round in transverse cross section, and may be used as a pushing or pulling tool, indicated in full and dotted lines in Figures 1 and 2, and applicants do not limit themselves in this particular.

As the stripping elements are worn down they are resharpened, however when they become too short they are discarded and replaced with new ones, thereby obviating the present practice of discarding the entire tool.

The stripping element 9a shown in Figures 3 and 4 is straight and has a cutting edge 10 for cutting and stripping the material from the rolls. The stripping element 9b shown in Figures 5 and 6 is for stripping a small amount of material from a roller without the cutting operation. Where there is a large accumulation on the rollers, the form shown in Figures 1 to 4 is preferably used.

From the above it will be seen that a roller stripping device is provided for use in cotton mills, which is simple in construction, the parts reduced to a minimum, and one wherein the detachable stripping elements may be easily replaced without discarding the tool as a whole and without waiting for the resharpening of the stand hook which is now a common practice.

The invention having been set forth what is claimed as new and useful is:

A tool for stripping cotton from steel calender rolls in cotton mills, said tool comprising a handle member, a shank extending axially from one end of said handle member, a soft metal member extending downwardly from the outer end of the shank at a right angle thereto, said soft metal downwardly extending member forming means for stripping cotton from the steel rolls without damage to the rolls, said soft metal downwardly extending member being threaded into the outer end of the shank, said soft metal member being formed of brass, said soft metal member being provided on its outer face with a vertically disposed cutting edge in the plane of the vertical longitudinal center of the shank.

JOHN M. BLACKMON.
JOSEPH F. LE GERE.